S. W. LUDLOW.
Vehicle-Spring.
No. 222,192. Patented Dec. 2, 1879.
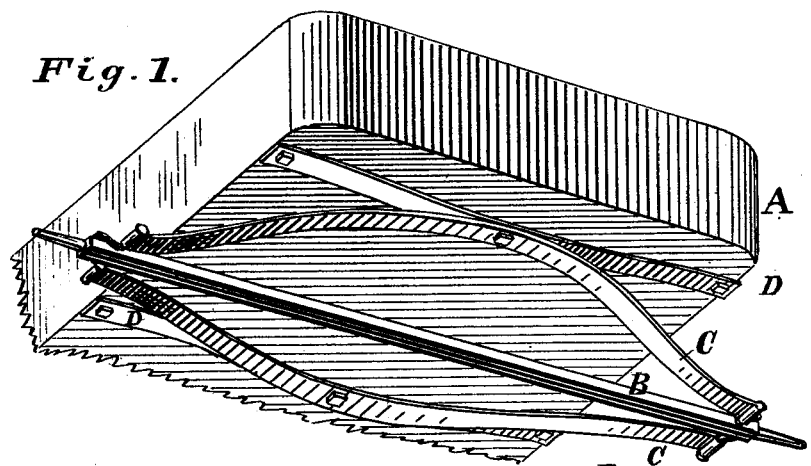
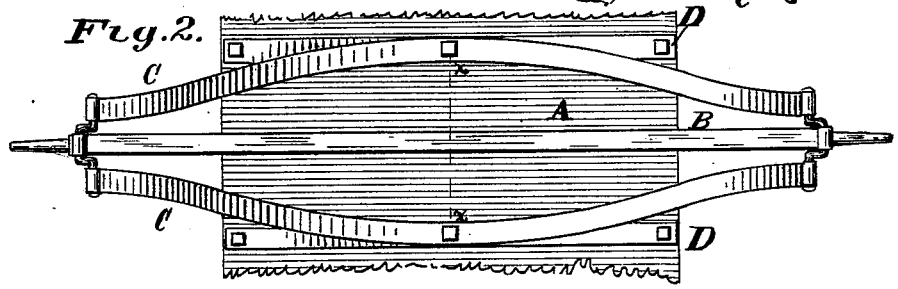

UNITED STATES PATENT OFFICE.

SAMUEL W. LUDLOW, OF CINCINNATI, OHIO.

IMPROVEMENT IN VEHICLE-SPRINGS.

Specification forming part of Letters Patent No. 222,192, dated December 2, 1879; application filed April 10, 1879.

*To all whom it may concern:*

Be it known that I, SAMUEL W. LUDLOW, of the city of Cincinnati, in the county of Hamilton and State of Ohio, have invented an Improvement in Combined Springs and Axles for Vehicles, of which the following is a specification.

The object of my invention is, first, to so mount the axle that longitudinal strains shall be taken up by a yielding resisting agency acting against the axle in the direction of the length of the vehicle; second, to so mount the axle that it shall be braced directly from the vehicle-body against longitudinal strains, while yielding in a vertical plane to ordinary jolts; and, third, to provide a combined spring and axle which, while retaining the advantages of the semi-elliptical springs bearing directly upon the axle, shall at the same time afford a sufficient support against longitudinal and lateral strains, and by its lightness, compactness, and simplicity shall be especially adapted to use on light vehicles.

The nature of my invention will best appear by reference to the accompanying drawings, in which Figure 1 is a perspective view of the improvement in its preferred form as applied to the body of the vehicle. Fig. 2 is a plan of the same from the under side.

A represents the vehicle-body; B, the axle; C, the springs, and D spring-bars, to which the springs are commonly attached.

The springs C have, with reference to the horizontal plane, the ordinary semi-elliptical curvature, with ogee extremities, and a similar curvature, though not necessarily the same in degree, with reference to the vertical plane through the axle. They are secured to the axle, advisably, one upon each side, either by pivoted links or stirrups, or in any suitable manner permitting endwise play.

I prefer to attach these springs at their center to spring-bars D, which may be semi-elliptical, or approximately so, as shown in the drawings, and may be made more or less flexible. These bars may, however, be made straight or rigid, or dispensed with altogether, and the springs attached directly to the body of the vehicle.

It will be seen that by giving the spring C the described curve with reference to the vertical plane it becomes, in a sense, a secondary spring, bracing the axle more or less yieldingly in the direction of the length of the vehicle, affording, under ordinary and general demands, within itself an adequate support against all strains longitudinal with the vehicle, dispensing with all extrinsic braces or coupling-bars, and securing a gentle elastic play to the vehicle-body when the vehicle is arrested or checked by any shock, while the primary curve, with reference to the horizontal plane, affords, besides this, the necessary vertical and lateral support. The axle is also allowed by this construction to yield to the frequent up-and-down jolts in a directly vertical plane, while braced immediately from the vehicle-body, instead of describing an arc having the point of attachment of the brace to the body as its axis.

The precise outlines of the spring C and the degree of curvature may be varied so long as the curvature with reference to both the horizontal and the vertical plane is preserved.

I commonly make the proportion such that with springs forty-two inches in length the extreme distance between the springs on the line $x\,x$, Fig. 2, would be about sixteen inches; but a considerable variation from this proportion may be made.

I claim as my invention—

1. The combination of a vehicle-body, an axle, and connections between the body and axle, arranged to form an elastic seat to the axle and brace it yieldingly in the direction of the length of the vehicle.

2. In combination with a vehicle-body, a spring-seated axle braced immediately from the body in such manner as to permit direct vertical play, substantially as described.

3. In combination with the axle and body of a vehicle, a semi-elliptical spring connecting the two, and curved in reference to both vertical and horizontal plane to adapt it for resisting strains, substantially as described.

4. In combination with the axle B, the springs C, arranged on each side of the axle, and curved with reference to both vertical and horizontal plane, substantially as and for the purposes described.

5. The combination, with the axle and body of a vehicle, of springs curved to resist strains longitudinal with said body, and attached to aid axle and body in such manner as to afford support against lateral strains.

6. The combination of axle B, springs C, having curvature to resist longitudinal strains, and the curved and flexible spring-bars D, substantially as and for the purposes described.

SAMUEL W. LUDLOW.

Attest:
 FRANCIS LAMPE,
 JOHN WRIGHT.